April 24, 1928. 1,667,621
L. H. BURNHAM
PRESSURE RELIEF PIPE FOR ELECTRICAL APPARATUS CASINGS
Filed April 4, 1927
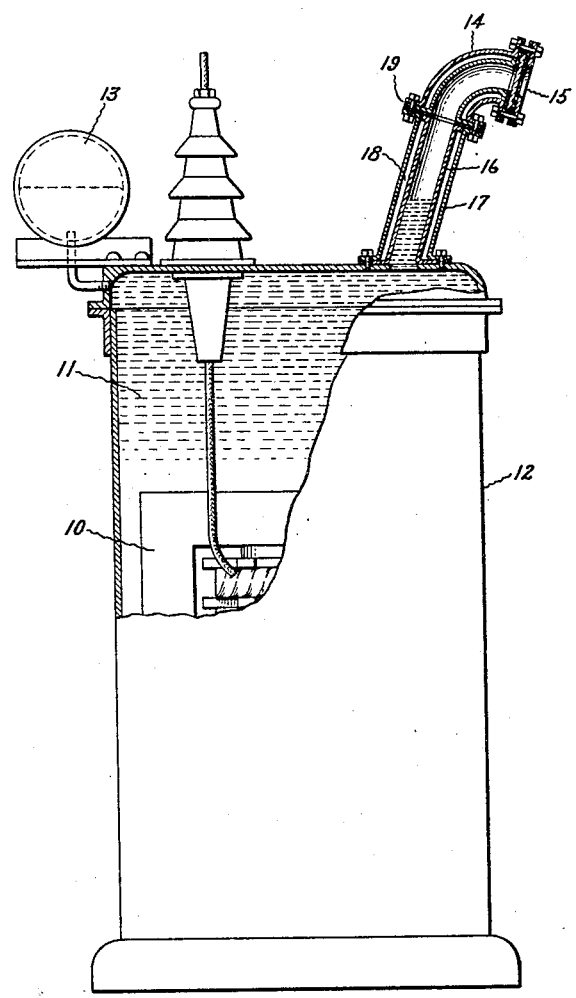
Inventor:
Locke H. Burnham,
by
His Attorney.

Patented Apr. 24, 1928.

1,667,621

UNITED STATES PATENT OFFICE.

LOCKE H. BURNHAM, OF PITTSFIELD, MASSACHUSETTS, ASSIGNOR TO GENERAL ELECTRIC COMPANY, A CORPORATION OF NEW YORK.

PRESSURE-RELIEF PIPE FOR ELECTRICAL-APPARATUS CASINGS.

Application filed April 4, 1927. Serial No. 180,981.

My invention relates to pressure relief pipes for electrical apparatus casings and more particularly for the type of casing which contains a body of insulating oil in which electrical apparatus is immersed. In operating oil immersed electrical apparatus such as a transformer, there is always the possibility of a breakdown of insulation or a short circuit which will result in an arc under the oil. This may produce a very sudden evolution of a large quantity of gas for which a suitable outlet must be provided or the pressure of the gas may burst the enclosing casing with serious consequences. The casing, particularly of an oil immersed transformer of large size, is therefore often provided with a pressure relief outlet in the form of a pipe of large cross section closed by a suitable rupturable or yieldable diaphragm or similar device which will give way under a predetermined pressure inside the casing and permit gas or oil or both to escape. This pressure relief pipe generally and preferably extends from the upper part or cover of the casing to a point above the oil level and the yieldable diaphragm closes the outer or upper end of the pipe where the oil cannot reach it under normal conditions. This avoids leakage of oil at the diaphragm and loss of oil in case the diaphragm should accidentally be broken or loosened. At least the upper or outer part of the pipe is thus filled with air or gas.

Even a very small quantity of moisture in the insulating oil in which electrical apparatus is immersed is objectionable because of its effect in lowering the dielectric strength of the oil. However, it is usually impossible to keep the oil free of all traces of moisture. The oil surrounding the apparatus, particularly that part of the oil which is in the upper part of the casing, becomes heated by the apparatus and it has been found that moisture dissolved or dispersed in this heated oil is sometimes vaporized and that the vapor rises into the upper or outer part of the pressure relief pipe where it condenses on the cool inner surface of the pipe. This condensed moisture may then run down along the inner surface of the pipe and settle through the oil in the form of drops of water onto the apparatus where it may cause a breakdown of the insulation and serious trouble. The general object of the invention is to provide an improved pressure relief pipe of such construction that this trouble may be reduced or eliminated.

The invention will be better understood from the following description taken in connection with the accompanying drawing which shows an encased oil immersed transformer provided with a pressure relief pipe constructed in accordance with the invention, the pressure relief pipe and a portion of the transformer casing being shown in section.

The transformer 10 shown in the drawing is immersed in a body of insulating oil 11 within a casing 12 which is connected to an expansion chamber 13 so that the casing may be kept full of oil at all times. A pressure relief pipe 14 communicates with the upper part of the casing 12 and is closed at its outer end by a suitable member 15 such as a glass diaphragm which will rupture or yield if the pressure in the casing rises to a predetermined value and thus relieve the pressure in the casing. This relief pipe 14 projects above the oil level so that at least its upper or outer portion is filled with air or gas and the oil cannot reach the diaphragm under normal conditions to leak past the diaphragm or to escape if the diaphragm be accidentally broken or loosened.

The transformer becomes heated during operation and this causes the oil, particularly in the upper part of the casing, to become hot. If this oil contains any moisture, the heat may vaporize it so that water vapor may rise into the pressure relief pipe 14 and mix with the air or gas in this pipe. Then if the inner surface of this pipe is cooler than the moist gas which it contains, the moisture may condense on the pipe and find its way back down onto the transformer in the form of drops of water. This is very apt to cause serious trouble by causing a breakdown of the transformer insulation. The outside air surrounding the pressure relief pipe 14 tends to keep this pipe and its inner surface cooler than the gas which it contains and which is kept warm by the heated oil with which it is in contact near the lower end of the pipe. The invention provides a pressure relief pipe arranged to reduce this difference in temperature between its inner surface and the moist gas with which it is in contact and thus to reduce or substantially eliminate the condensation of the moisture and the trouble which this may cause.

The pressure relief pipe 14 comprises two concentric spaced sections, the inner section 16 and the outer section 17 being separated by a heat insulating space 18 which may contain air or other heat insulating material. The pipe sections 16 and 17 may be of any suitable sheet metal material, the inner section being preferably of some non-corrosive material such as tin or it may be tin lined. The upper end of the pipe 14 is shown as being curved to divert to one side any oil and gas which may be ejected and a joint 19 may be provided if necessary just below the curve to permit assembly of the parts. It will be apparent that the heat insulating space 18 will substantially reduce the rate at which heat from the inner pipe section 16 will be dissipated to the surrounding air and that the temperature of the inner surface of this pipe section 16 will be maintained much nearer that of the warm gas inside this pipe section than is the case where the cool outside air is separated from the warm gas inside by a single pipe wall as has heretofore been done. This substantial reduction in the difference between the temperatures of the warm gas in the pipe and the inner surface of the pipe with which it is in contact results in substantially reducing or in eliminating the condensation of moisture which may occur in the gas so that little or no water can find its way down from the pipe onto the transformer to cause trouble.

While a particular form of the invention has been described and illustrated, it will be apparent that various changes may be made within the scope of the invention as defined in the appended claim.

What I claim as new and desire to secure by Letters Patent of the United States is:

The combination with a casing for oil immersed electrical apparatus, of a pressure relief pipe communicating with said casing and extending above the oil level, and a yieldable member normally closing the outer end of said pipe, said pipe comprising two concentric sections with an intervening heat insulating space to prevent rapid dissipation of heat from said inner pipe section.

In witness whereof, I have hereunto set my hand this first day of April, 1927.

LOCKE H. BURNHAM.